United States Patent
Chen et al.

(10) Patent No.: US 10,055,828 B2
(45) Date of Patent: Aug. 21, 2018

(54) METHOD FOR RETRIEVING ATMOSPHERIC AEROSOL BASED ON STATISTICAL SEGMENTATION

(71) Applicant: University of Electronic Science And Technology of China, Chengdu, Sichuan (CN)

(72) Inventors: Yunping Chen, Sichuan (CN); Yaju Xiong, Sichuan (CN); Ling Tong, Sichuan (CN); Weihong Han, Sichuan (CN)

(*) Notice: Subject to any disclaimer, the term of this patent is extended or adjusted under 35 U.S.C. 154(b) by 87 days.

(21) Appl. No.: 15/361,933

(22) Filed: Nov. 28, 2016

(65) Prior Publication Data
US 2017/0294011 A1   Oct. 12, 2017

(30) Foreign Application Priority Data
Apr. 8, 2016   (CN) .......................... 2016 1 0217370

(51) Int. Cl.
| | |
|---|---|
| *G06T 7/00* | (2017.01) |
| *G06K 9/46* | (2006.01) |
| *H04N 5/33* | (2006.01) |
| *G06K 9/62* | (2006.01) |
| *H04N 17/00* | (2006.01) |

(Continued)

(52) U.S. Cl.
CPC .......... *G06T 7/0002* (2013.01); *G06K 9/0063* (2013.01); *G06K 9/34* (2013.01); *G06K 9/4642* (2013.01); *G06K 9/4661* (2013.01); *G06K 9/52* (2013.01); *G06K 9/6212* (2013.01); *G06K 9/6267* (2013.01); *G06T 7/11* (2017.01); *H04N 5/33* (2013.01); *H04N 17/002* (2013.01);

(Continued)

(58) Field of Classification Search
None
See application file for complete search history.

(56) References Cited

U.S. PATENT DOCUMENTS

2014/0019166 A1*  1/2014  Swanson ................ G06Q 40/08
                                                              705/4

* cited by examiner

*Primary Examiner* — Anand S Rao
*Assistant Examiner* — Tyler B Edwards
(74) *Attorney, Agent, or Firm* — Billion & Armitage; Benjamin C. Armitage

(57) ABSTRACT

The present invention discloses a method for retrieving atmospheric aerosol based on statistical segmentation. Firstly a multi-band remote sensing image including an apparent reflectance and an aerosol optical thickness look-up table corresponding to a retrieval band is obtained, then pixels are partitioned and screened according to apparent reflectance segments of a mid-infrared 2.1 micrometer band. After that the retained pixel sets are further partitioned and screened according to the apparent reflectance segments of the mid-infrared 1.6 micrometer band. Finally the obtained pixel sets are partitioned into two categories according to the pixel number, one category including pixels having more pixels, the other including those with less pixels.
The category with more pixels is taken as the reference part for retrieval. Specifically, the pixel sets are first searched for the clean segment, then the ground surface reflectivity of the clean segment is taken as the ground surface reflectivity of the whole pixel set, thereby obtaining the aerosol thickness value through retrieval. After that these pixels are taken as references to perform retrieval on the other category.
The present invention can improve accuracy and resolution of the retrieval result of the bright ground surface area, and is applied to a wider range.

6 Claims, 8 Drawing Sheets

(51) Int. Cl.
 *G06T 7/11* (2017.01)
 *G06K 9/00* (2006.01)
 *G06K 9/34* (2006.01)
 *G06K 9/52* (2006.01)
(52) U.S. Cl.
 CPC ............... *G06T 2207/30181* (2013.01); *G06T 2207/30204* (2013.01)

(a) Overall partitioning  (b) Partial partitioning

METHOD FOR RETRIEVING ATMOSPHERIC AEROSOL BASED ON STATISTICAL SEGMENTATION

TECHNICAL FIELD

The present invention relates to the field of information remote sensing technologies, and more particularly to a method for retrieving atmospheric aerosol based on statistical segmentation.

BACKGROUND ART

The atmospheric aerosol is a multi-phase system formed by atmosphere as well as solid and liquid particles suspending therein. It is a mixture consisting of molecular groups and liquid or solid particles suspending in the air and having certain stability, a small sedimentation rate, and a size ranging from one micrometer to dozens of micrometers. Aerosol particles mainly originate from artificial sources such as industrial activities, biological burning and the like, as well as natural sources such as dusts, offshore marine particles and the like.

Research shows that the atmospheric aerosol not only affects radiation balance of an earth surface layer system, but also causes the earth-atmosphere system to cool by adjusting a reflectivity of an earth atmosphere system through scattering solar shortwave radiation. It also causes a heating process through absorbing the solar radiation, and changes microphysical properties of clouds by affecting the microphysical process of formation of the clouds. Aerosol also significantly influences atmospheric chemical processes and biogeochemical cycle. At the same time, the aerosol particles contain some particles harmful to human body, which may cause serious problem to the health of human beings, especially in heavily populated urban areas with many industries. Therefore, retrieval of the atmospheric aerosol has a significant meaning to research of global climate change as well as monitoring and management of atmospheric pollution.

Currently, researchers home and abroad have made quite some achievements in terms of aerosol remote sensing retrieval. They also pay much attention to monitoring of the aerosol in designing novel sensors. However, most of the conventional retrieval algorithms are directed to large-size aerosol having average properties, and quite limited in terms of applications. For example, such algorithms are only adapted to dark ground surface. At present, there is no effective aerosol retrieval algorithm adapted to bright ground surface areas such as cities.

DISCLOSURE OF THE INVENTION

An object of the present invention is to provide a method for retrieving atmospheric aerosol based on statistical segmentation. Two parts are partitioned by way of statistical segmentation, and aerosol thickness values thereof are retrieved using different methods, thereby improving accuracy and resolution of the retrieval result of the bright ground surface area.

In order to meet the above-mentioned objective of the present invention, the method for retrieving atmospheric aerosol based on statistical segmentation in the present invention comprises steps of:

S1: acquiring a multi-band remote sensing image of an analyzed area through a satellite, and performing radiometric calibration to obtain a multi-band remote sensing image comprising an apparent reflectance, wherein the multi-band remote sensing image comprises a mid-infrared 1.6 micrometer band and a mid-infrared 2.1 micrometer band, and one band is selected from the multi-band remote sensing image as an retrieval band;

S2: inputting the multi-band remote sensing image into an atmospheric radiative transfer model, obtaining a corresponding aerosol optical thickness look-up table according to the retrieval band, wherein the look-up table includes parameters corresponding to each aerosol thickness value AOT for calculating the apparent reflectance;

S3: for all pixels in the multi-band remote sensing image, performing segmentation using a statistical segmentation method, wherein the segmentation method comprises the steps of:

S3.1: partitioning an apparent reflectance range of the mid-infrared 2.1 micrometer band into N segments $\varphi_n$, according to a predetermined interval $\lambda_1$, n=1, 2, ..., N;

S3.2: allocating respective pixels into corresponding segments, to a obtain pixel sets $x_n$ corresponding to respective segments $\varphi_n$, according to an apparent reflectance of each pixel of the multi-band remote sensing image in the mid-infrared 2.1 micrometer band;

S3.3: for each pixel set $x_n$ obtained in step S3.2, if a number of pixels in the pixel set $x_n |x_n| \geq T_1$, $T_1$ representing a predetermined threshold value, retaining the pixel set, otherwise deleting it; marking a retained pixel set as $x_{n'}$, n'=1, 2, ..., N', N' being a number of the retained pixel sets;

S3.4: partitioning an apparent reflectance range of the mid-infrared 1.6 micrometer band into M segments $\gamma_m$, according to a predetermined interval $\lambda_2$, m=1, 2, ..., M;

S3.5: for each pixel set $x_{n'}$, allocating each pixel to a corresponding segment, to obtain pixel sets $y_{n'm}$ corresponding to respective segments $\gamma_m$ in the pixel set, according to an apparent reflectance of each pixel of the pixel set $x_{n'}$ at the mid-infrared 1.6 micrometer band;

S3.6: if a number of pixels in the pixel set $y_{n'm} |y_{n'm}| \geq T_2$, $T_2$ being a predetermined threshold value, retaining the pixel set, otherwise deleting it; marking retained pixel set as $y_k$, k=1, 2, ..., K, K being a number of the retained pixel sets;

S3.7: categorizing the K pixel sets $y_k$ retained in step S306, according to a predetermined threshold $T_3$, and if a number of pixels in the pixel set $y_k |y_k| \geq T_3$, $T_3$ being a predetermined threshold value, categorizing the pixel set $y_k$ into the set $Y_s$, otherwise categorizing it into a set $Y_t$;

S4: marking a p-th pixel set in the set $Y_s$ as $y_{s,p}$, p=1, 2, ..., $|Y_s|$, $|Y_s|$ being the number of the pixel sets in the set $Y_s$, performing retrieval on each pixel set $y_{s,p}$ one by one according to steps of:

S4.1: partitioning an apparent reflectance range of the retrieved band into D segments $\omega_d$ according to a predetermined interval $\lambda_3$, d=1, 2, ..., D; allocating respective pixels of the pixel set $y_{s,p}$ into a corresponding segment according to an apparent reflectance of the respective pixels at the retrieved band, to obtain a pixel set $z_{s,p,d}$ corresponding to each segment $\omega_d$ in the pixel set;

S4.2: obtaining pixel sets with a number of pixels $|z_{s,p,d}| \geq T_4$ by searching the D pixel sets $z_{s,p,d}$, $T_4$ being a predetermined threshold value, selecting from the obtained pixel sets a pixel set d* having a smallest segment serial number d as a clean segment in the pixel set $y_{s,p}$;

S4.3: designating an apparent reflectance of the clean segment $z_{s,p,d*}$ at the retrieved band as $\rho^*_s = \lambda_3 \times d^*$, and designating a corresponding aerosol thickness value $AOT_{s,p,d*} = AOT_0$, $AOT_0$ being a predetermined aerosol thickness value of the clean segment; obtaining parameters corresponding to $AOT_{s,p,d*}$ from the aerosol optical thickness look-up table, and calculating the ground surface reflectivity corresponding to the clean segment $z_{s,p,d*}$ according to the apparent reflectance $\rho^*_s$;

S4.4: taking the ground surface reflectivity corresponding to the clean segment $z_{s,p,d*}$ as the ground surface reflectivity of the whole pixel set $y_{s,p}$, and obtaining the aerosol thickness value of each pixel in the pixel set $y_{s,p}$ through retrieval;

S5: performing retrieval on the set $Y_t$ according to the steps of:

S5.1: traversing all pixels in the set $Y_s$, to search for pixels with no values within a predetermined radius, designating an aerosol thickness value of a pixel with no value as the aerosol thickness value of the pixel, and marking all designated pixel sets as $P_s$;

S5.2: for each pixel in the set $P_s$, obtaining parameters corresponding to the designated aerosol thickness value from the aerosol optical thickness look-up table, and then calculating and obtaining the ground surface reflectivity of the pixel according to the apparent reflectance;

S5.3: gridding the multi-band remote sensing image according to a predetermined side length;

S5.4: marking a q-th pixel set in the set $Y_t$ as $y_{t,q}$, q=1, 2, ..., $|Y_t|$, $|Y_t|$ being a number of the pixel sets in the set $Y_t$; for each pixel set $y_{t,q}$, finding an intersection with $P_s$ from each grid partitioned in step S5.3, and making the ground surface reflectivity of all pixels of the pixel set $y_{t,q}$ in a current grid equal to an average ground surface reflectivity value of all pixels in the intersection;

S5.5: performing aerosol thickness value retrieval on each pixel assigned with the ground surface reflectivity in the step S5.4, to obtain the aerosol thickness value of the pixel;

S6: for remaining pixels with no values in the multi-band remote sensing image, designating aerosol thickness values thereof through interpolation.

In the method for retrieving atmospheric aerosol based on statistical segmentation in the present invention, the aerosol optical thickness look-up table of the multi-band remote sensing image and the retrieval band are obtained first, then the pixels are partitioned and screened according to the apparent reflectance segments of the mid-infrared 2.1 micrometer band. After that the retained pixel sets are further partitioned and screened according to the apparent reflectance segments of the mid-infrared 1.6 micrometer band. Finally the obtained pixel sets are partitioned into two categories according to the pixel number, one category including pixels having more pixels, the other including those with less pixels. The category with more pixels is taken as the reference part for retrieval. Specifically, the pixel sets are first searched for the clean segment, then the ground surface reflectivity of the clean segment is taken as the ground surface reflectivity of the whole pixel set, thereby obtaining the aerosol thickness value through retrieval. After that these pixels are taken as references to perform retrieval on the other category.

The present invention adopts a novel method when calculating the ground surface reflectivity. According to this method, the ground surface reflectivity is determined according to the clean pixel and the reference segment, instead of depending on a dark pixel. Therefore, as long as completion of the statistical segmentation is satisfied, the retrieval can be performed. Consequently, the present invention also has good retrieval effect for bright ground surface area, and has wider applicability compared with the conventional dark pixel algorithm.

DETAILED DESCRIPTION OF EMBODIMENTS

In the following, specific embodiments of the present invention will be described in detail with reference to the accompanying drawings such that a person skilled in the art can better understand the invention. In the following description, it is noted that well-known functions and configurations are not described in detail to avoid obscuring the present invention.

EXAMPLES

Figure 1:
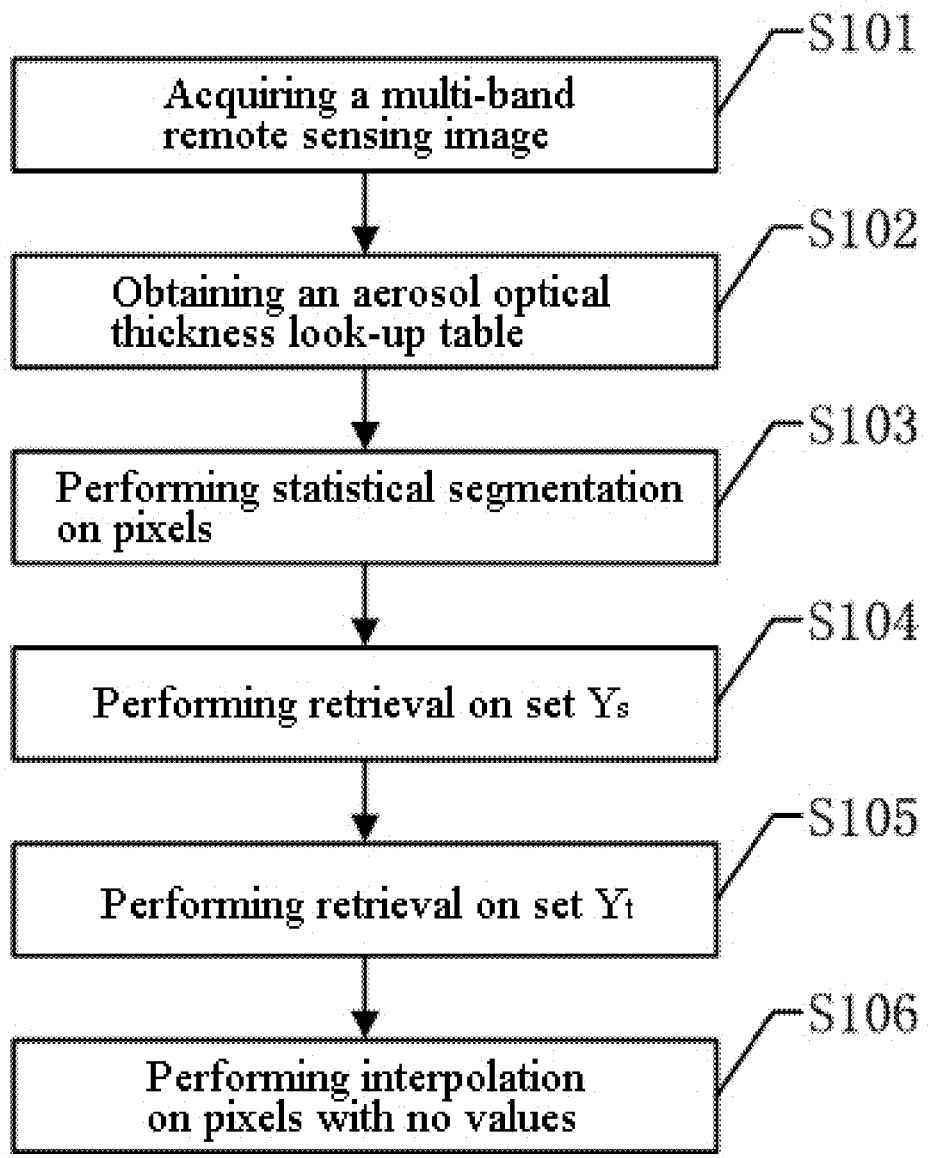
FIG. 1 schematically illustrates a flow chart of a method for retrieving atmospheric aerosol based on statistical segmentation in accordance with an embodiment of the present invention.

FIG. 1 is a flow chart of a method for retrieving atmospheric aerosol based on statistical segmentation according to an embodiment of the present invention. As shown in FIG. 1, the method for atmospheric aerosol retrieval based on statistical segmentation comprises the following steps:

S101: acquiring a multi-band remote sensing image:

A multi-band remote sensing image of an analyzed area is acquired through a satellite, and radiometric calibration is performed to obtain a multi-band remote sensing image comprising an apparent reflectance. The multi-band remote sensing image comprises a mid-infrared 1.6 micrometer band and a mid-infrared 2.1 micrometer band, and one band is selected from the multi-band remote sensing image as a retrieval band.

Currently the LANDSAT satellite is used to acquire the multi-band remote sensing image. In a LANDSAT 8 OLI image there are 11 bands, namely, Band 1 navy-blue, Band 2 blue-green, Band 3 green, Band 4 red, Band 5 near-infrared, Band 6 mid-infrared 1.6 micrometer band, Band 7 mid-infrared 2.1 micrometer band, Band 8 full-color, Band 9 cirrus, Band 10 thermal infrared, and Band 11 thermal infrared. Band 6 mid-infrared and Band 7 mid-infrared are used in the present invention. The retrieval band selected in the present example is Band 1 navy-blue, this is because Band 1 in the LANDSAT 8 OLI image is more sensitive to the aerosol, and can therefore improve the retrieval accuracy.

Figure 2:
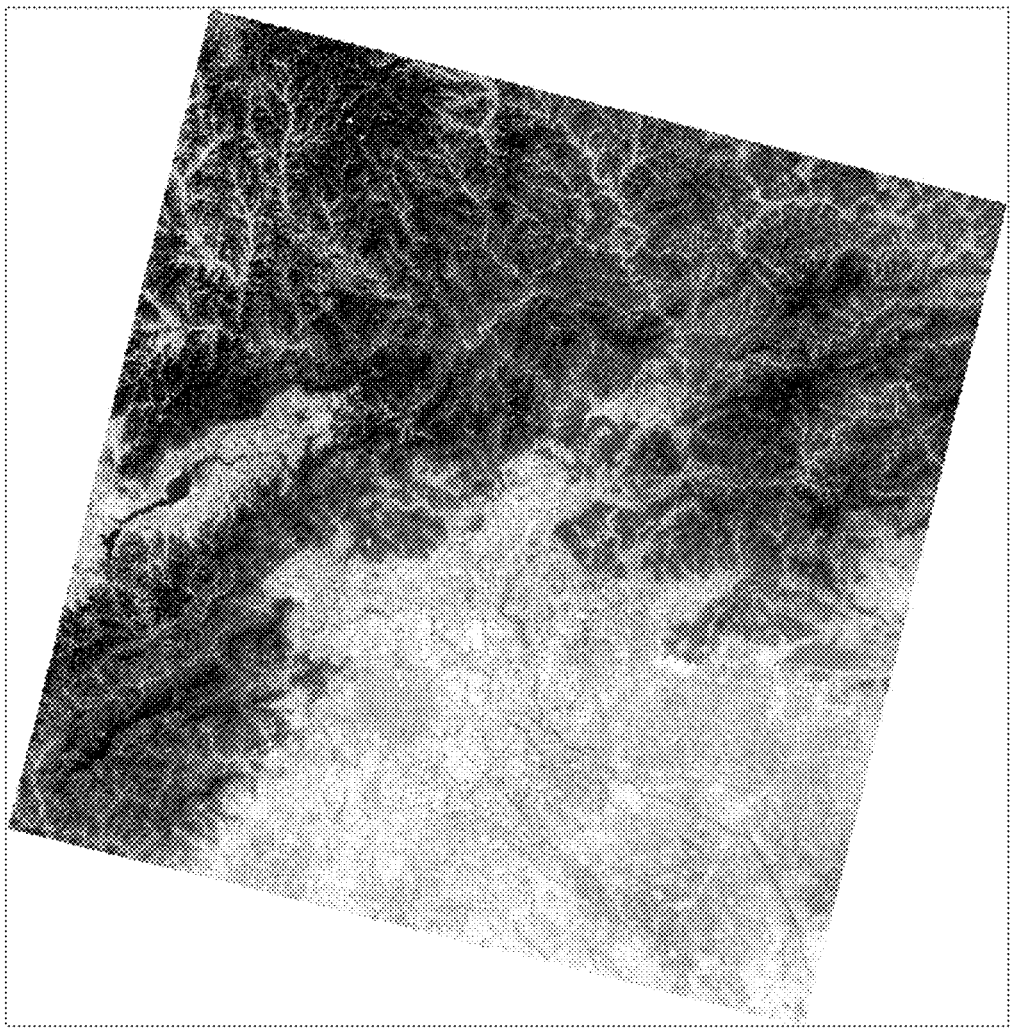
FIG. 2 is a diagram of an image used in the present example.

An image taken on the 103th day of the year 2014 in Beijing is used in the present example. FIG. 2 is the image used in the present example. As shown in FIG. 2, this image includes bright ground surface areas (with relatively light-color).

S102: acquiring an aerosol optical thickness look-up table:

The multi-band remote sensing image obtained in step S101 is input into an atmospheric radiative transfer model, thereby arriving at a corresponding aerosol optical thickness look-up table according to the retrieval band. The look-up table includes parameters corresponding to each aerosol thickness value AOT for calculating the apparent reflectance. In the present example, assuming that an underlying surface is a Lambertian surface, its apparent reflectance $\rho_{TOA}$ is calculated as:

$$\rho_{TOA} = \rho_0 + \frac{T_s \cdot T_s \cdot \rho_s}{1 - \rho_s \cdot S}$$

where $\rho_0$ is an atmospheric path radiation reflectivity, $\rho_s$ is a ground surface reflectivity, S is a downward hemispherical emissivity of a lower atmospheric layer, $T_s$ is a total transmittance of incident light from top of the atmosphere to the ground surface, $T_v$ is a total transmittance of light upwardly entering a satellite sensor field. Therefore it can be seen that in the present example the parameters which need to be included in the look-up table include the atmospheric path radiation reflectivity, the atmosphere hemispherical emissivity, and a product of the total transmittance of the incident light from the top of the atmosphere to the ground surface and the total transmittance upwardly entering a satellite sensor field.

Currently, there are many atmospheric radiative transfer models. In the embodiment, the most common 6S radiative transfer model is used. In addition to the multi-band remote sensing image, other parameters that need to be input into the 6S radiative transfer model include: date, zenith angle, and azimuth angle corresponding to the multi-band remote sensing image, an aerosol type and atmosphere mode, a step size of the aerosol thickness value and so on. The atmosphere mode selected in the present example is mid-latitude summer, the aerosol type is a continental type, and the selected retrieval band is Band 1 navy-blue. Table 1 is a look-up table acquired in the present example.

TABLE 1

| AOT | $\rho_0$ | S | $T_s \cdot T_v$ |
|---|---|---|---|
| 0.01 | 0.09094 | 0.75823 | 0.174 |
| 0.02 | 0.09178 | 0.75323 | 0.17572 |
| ... | ... | ... | ... |
| 2.99 | 0.24386 | 0.07449 | 0.306720 |

S103: performing statistical segmentation on the pixels:

For all pixels in the multi-band remote sensing image, segmentation is performed using a statistical segmentation method. As the mid-infrared 1.6 micrometer band and mid-infrared 2.1 micrometer band have relatively long wavelengths, their apparent reflectances are approximately equal to the ground surface reflectivities. Therefore, the apparent reflectances of the mid-infrared 1.6 micrometer band and the mid-infrared 2.1 micrometer band are used to segment the pixels in the present invention. Since the LANDSAT 8 OLI image is used in the present example, the mid-infrared 1.6 micrometer band is Band 6, and the mid-infrared 2.1 micrometer band is Band 7.

Figure 3:
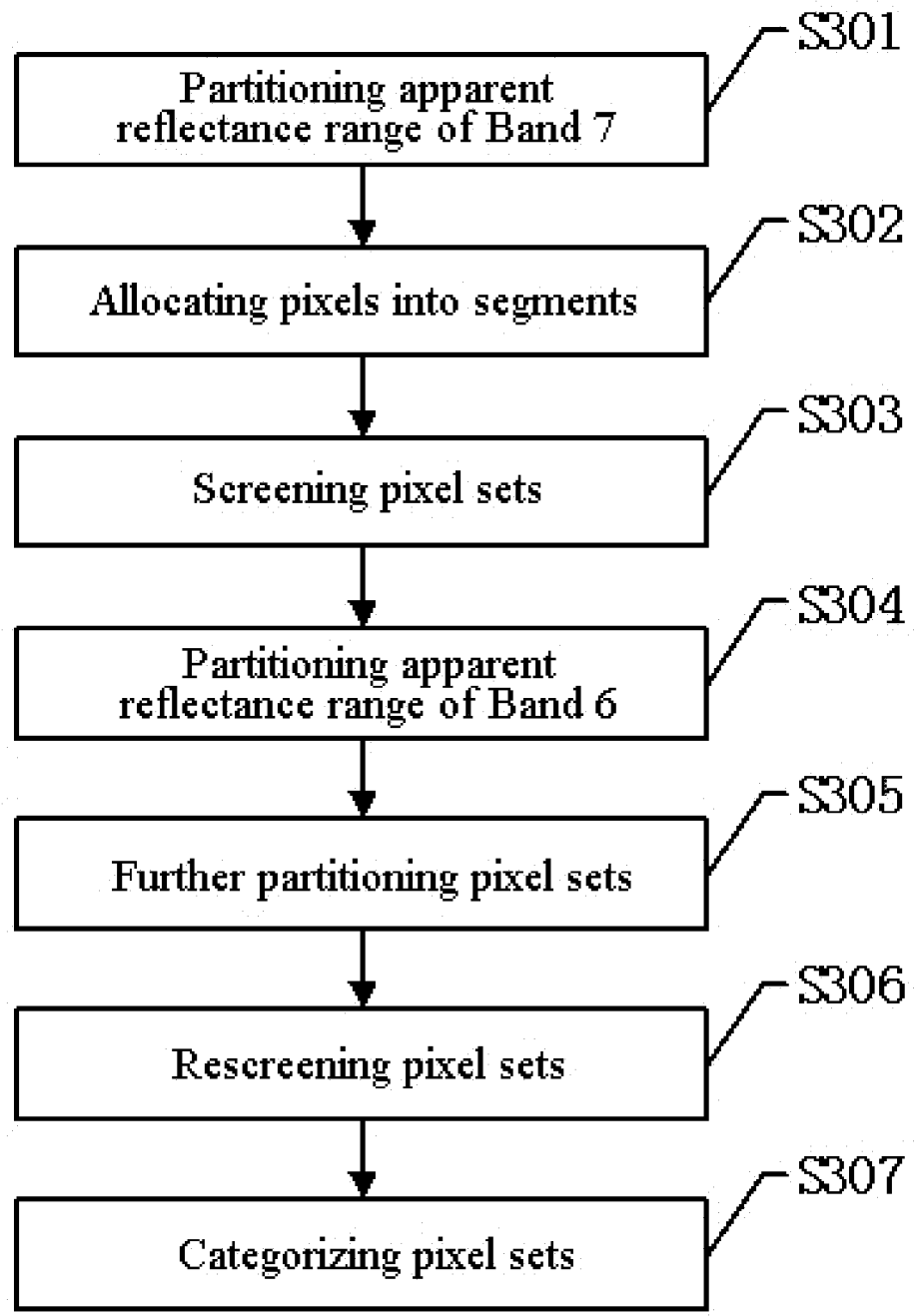
FIG. 3 schematically illustrates a flow chart of statistical segmentation in accordance with an embodiment of the present invention.

FIG. 3 is a flow chart of statistical segmentation in accordance with an embodiment of the present invention. As shown in FIG. 3, the statistical segmentation in the present invention comprises the following steps:

S301: partitioning the apparent reflectance of Band 7 into segments:

The apparent reflectance range of Band 7 is partitioned into N segments $\varphi_n$ according to a predetermined interval $\lambda_1$, n=1, 2, ..., N. The partitioning interval $\lambda_1$ can be determined as needed. Generally, the interval $\lambda_1$ is in the range of $0.002 \leq \lambda_1 \leq 0.01$.

S302: allocating the pixels:

Based on apparent reflectances in Band 7 of respective pixels of the multi-band remote sensing image, the pixels are allocated to corresponding segments, to obtain pixel sets $x_n$ corresponding to respective segments $\varphi_n$. Assuming that an apparent reflectance of a pixel at Band 7 is marked as $\rho$, then a serial number of its corresponding segment will be $\lceil \rho/\lambda \rceil$, $\lceil \ \rceil$ is rounding up to an integer.

Figure 4:
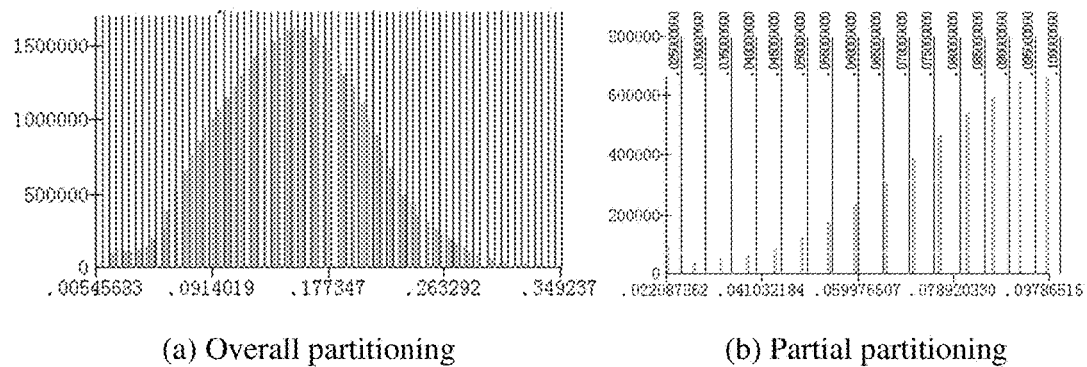
FIG. 4 schematically illustrates partitioning pixels of Band 7 in accordance with an embodiment of the present invention.

FIG. 4 is a diagram illustrating partitioning part of the pixels of Band 7 at an interval of 0.005 in the present example. FIG. 4(*a*) is an overall diagram of the partitioning, and FIG. 4(*b*) is a partial diagram of the partitioning. As shown in FIG. 4, by partitioning the apparent reflectance range of Band 7 into segments, the pixels in the multi-band remote sensing image can be partitioned into segments.

S303: screening pixel sets:

N pixel sets $x_n$ obtained in step S302 are evaluated one by one. If a number of pixels in the pixel set $x_n |x_n| \geq T_1$, $T_1$ being a predetermined threshold value, this pixel set is retained, otherwise it is deleted. The retained pixel sets are marked as $x_{n'}$, n'=1, 2, ..., N', N' is the number of the pixel sets retained after the screening. The value of the threshold $T_1$ may also be set as needed. Apparently, the higher the resolution of the multi-band remote sensing image and the larger the interval $\lambda_1$ are, the more pixels are included in each segment. Correspondingly, the threshold value $T_1$ may also be set to be slightly higher, otherwise the threshold value $T_1$ may be set to be slightly lower. In the present example, $T_1$=100000.

S304: partitioning the apparent reflectance of Band 6 into segments:

The apparent reflectance range of Band 6 is partitioned into M segments $\gamma_m$ according to a predetermined interval $\lambda_2$, m=1, 2, ..., M. Likewise, the partitioning interval $\lambda_2$ can be determined as needed, and may be within the range of $0.002 \leq \lambda_2 \leq 0.01$.

S305: further partitioning the pixel sets:

Each pixel set $x_{n'}$ retained in step S303 is further partitioned. The further partitioning may be performed in the following way: each pixel within each pixel set $x_{n'}$ is allocated into a corresponding segment according to an apparent reflectance of the pixel at Band 6, to obtain a pixel set $y_{n'm}$ corresponding to respective segment $\gamma_m$ in this pixel set. Apparently, after further partitioning the pixel sets, N'×M pixel sets in total are obtained.

S306: re-screening the pixel sets:

The N'×M pixel sets obtained in step S305 are screened again. If a number of pixels in the pixel set $y_{n'm} |y_{n'm}| \geq T_2$, $T_2$ is a predetermined threshold value, this pixel set is retained, otherwise it is deleted. The pixel set retained after the screening is marked as $y_k$, k=1, 2, ..., K, K is the number of the pixel sets retained after the screening. Like the threshold value $T_1$, the threshold value $T_2$ may also be set as needed. Since the pixel set $y_{n'm}$ is a pixel set obtained after further partitioning, the number of pixels in the pixel set $y_{n'm}$ will definitely be less, therefore $T_2$ is definitely smaller than $T_1$. In the present example, $T_2=10000$.

S307: categorizing the pixel sets:

The K pixel sets $y_k$ obtained after screening in step S306 are categorized according to a predetermined threshold $T_3$. If a number of pixels in the pixel set $y_k|y_k|\geq T_3$, $T_3$ is a predetermined threshold value, this pixel set is categorized into a set $Y_s$, otherwise it is categorized into a set $Y_t$. Correspondingly, the threshold value $T_3$ is also set as needed. In the present example, $T_3$ is in the range of $100000 < T_3 < 200000$. In the present example, it is selected to be $T_3=200000$. Apparently, the sets $Y_s$ and the sets $Y_t$ include many small pixel sets.

Figure 5:
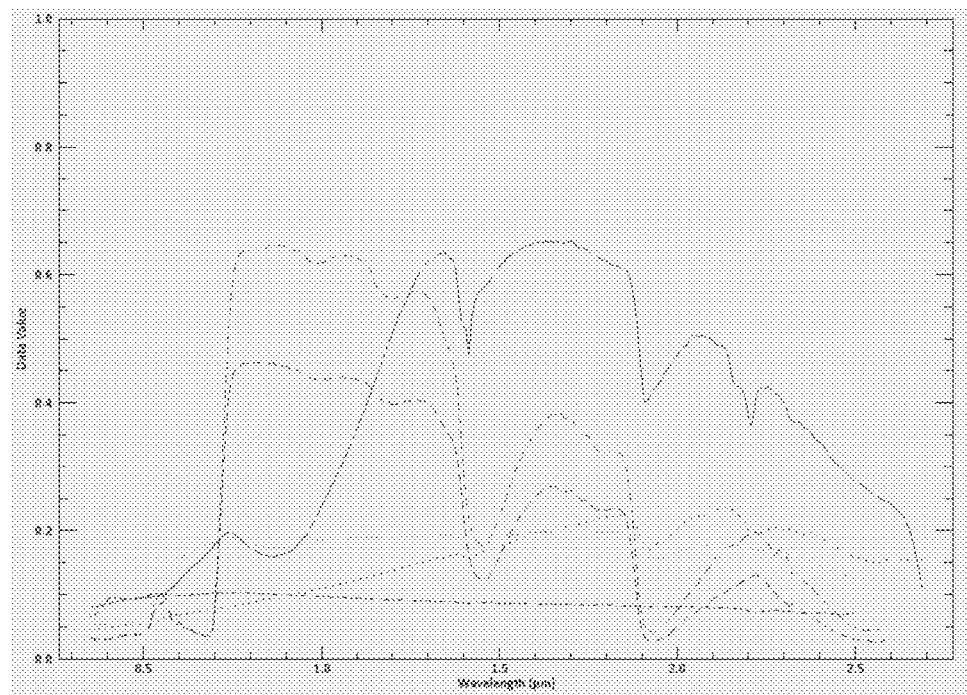
FIG. 5 schematically illustrates spectral curves of ground surface reflectivity.

The pixels in the multi-band remote sensing image are segmented according to the apparent reflectances of Band 6 and Band 7 by using the above steps. FIG. 5 schematically illustrates spectral curves of ground surface reflectivities. FIG. 5 shows spectral curves of ground surface reflectivities of some objects in an ENVI standard spectrum database. It can be seen by studying spectral curves of a lot of objects that the same or different objects may have different ground surface reflectivity curves under different conditions, and the reflectivity curves may overlap with each other at the mid-infrared 1.6 micrometer band and the mid-infrared 2.1 micrometer band. However, it rarely happens like this, especially for regular objects. Moreover, error can be reduced through two subsequent different methods of processing the segmentation results. At the same time, the error can also be reduced by including the smallest number of pixels in each segment. Therefore, although there may be errors in the segmentation method used in the present invention, the pixels in the multi-band remote sensing image can still be partitioned into many segments using the mid-infrared 1.6 micrometer band and the mid-infrared 2.1 micrometer band. If no error exists in these segments, the pixels belonging to the same segment should have approximately the same ground surface reflectivity curve, and their ground surface reflectivities at the retrieval band should be approximately equal.

S104: performing retrieval on the sets $Y_s$:

In the present invention, the sets $Y_s$, taken as a reference set, are processed using a method of retrieving polluted pixels based on clean pixels.

In the retrieval of aerosol, it is very important to obtain the ground surface reflectivity. It is shown by experiments that each pixel segment in the reference sets $Y_s$ has few errors, this is mainly because each pixel set in the reference sets $Y_s$ is the same type of regular object, for example, vegetation and bare earth and so on. In the meantime, some errors can be further eliminated by setting a big threshold value. Moreover, the probability that each pixel set in $Y_s$ contain clean pixels is relatively high. The p-th pixel set in $Y_s$ is marked as $y_{s,p}$, $p=1, 2, \ldots, |Y_s|$, $|Y_s|$ representing a number of the pixel sets in the sets $Y_s$. It can arrive at $\rho_{s,p} \approx \rho^*_{sP}$ according to characteristics of the statistical segmentation method, where $\rho_{s,p}$ is an approximate ground surface reflectivity of each pixel set $y_{s,p}$ at Band 1, $\rho^*_s$ is the ground surface reflectivity of a clean pixel in the pixel set $y_{s,p}$ at the retrieval band (which is Band 1 in the present example). Thus, as long as the ground surface reflectivities of the clean pixels in each pixel set are obtained, the ground surface reflectivities of all pixels in the pixel set can be obtained.

Therefore, it is necessary to obtain the ground surface reflectivities of the clean pixels in each pixel set first.

Figure 6:
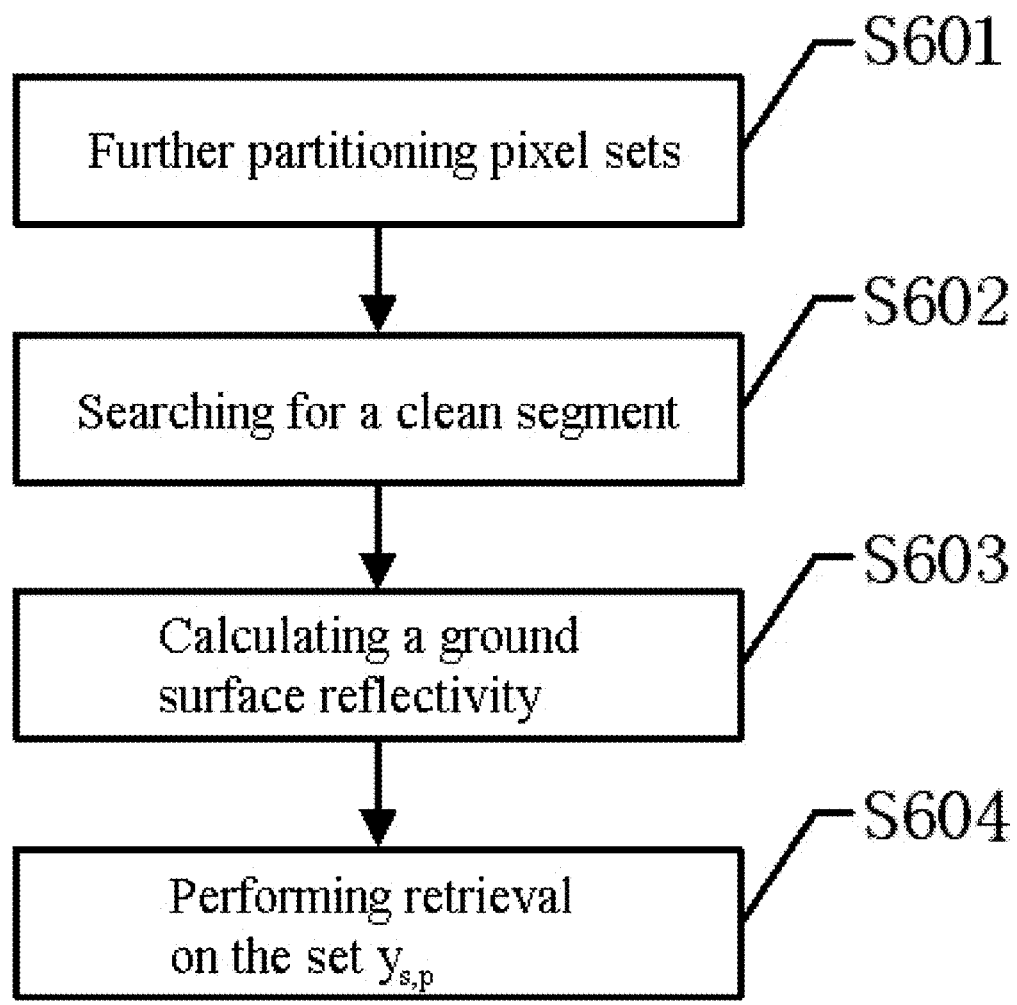
FIG. 6 schematically illustrates a flow chart of performing retrieval on each pixel set $y_{s,p}$ in the set $Y_s$.

FIG. 6 is a diagram illustrating a flow chart of retrieving each pixel set $y_{s,p}$ in the sets $Y_s$. As shown in FIG. 6, a detailed method for retrieving the pixel set $y_{s,p}$ is as follows:

S601: further partitioning the pixel set:

An apparent reflectance range of Band 1 is partitioned into D segments $\omega_d$ according to a predetermined interval $\lambda_3$, $d=1, 2, \ldots, D$. Likewise, the partitioning interval $\lambda_3$ can be determined as needed, and the interval $\lambda_3$ is in the range of $0.002 \leq \lambda_3 \leq 0.01$. Each pixel in the pixel set $y_{s,p}$ is allocated into a corresponding segment according to an apparent reflectance of the pixel at Band 1, to obtain a pixel set $z_{s,p,d}$ corresponding to each segment $\omega_d$ in this pixel set.

S602: searching for a clean segment:

Pixel sets with pixel number $|z_{s,p,d}| \geq T_4$ are obtained by searching D pixel sets $z_{s,p,d}$, $T_4$ is a predetermined threshold value. A pixel set $d^*$ having the smallest segment serial number d is chosen from the found pixel sets as a clean segment in the pixel set $y_{s,p}$.

The threshold value $T_4$ is also set as needed. Generally, the threshold value $T_4$ is in the range of $0.02|Y_s| \leq T_4 \leq 0.1|Y_s|$, and can be selected according to a pollution range of the multi-band remote sensing image. The larger the pollution range is, the smaller this value may be set. In the present example, it is set to $T_4 = 0.031|Y_3|$.

S603: calculating a ground surface reflectivity:

Assuming an apparent reflectance of the clean segment $z_{s,p,d^*}$ at Band 1 is $\rho^*_s = \lambda_3 \times d^*$, and its aerosol thickness value AOT is $AOT_{s,p,d^*} = AOT_0$, $AOT_0$ is a predetermined aerosol thickness value of the clean segment. Apparently, $AOT_0$ should be a minimum value set in advance according to actual situations. Parameters corresponding to $AOT_{s,p,d^*}$ are looked up and obtained from the aerosol optical thickness look-up table. Then the ground surface reflectivity corresponding to the clean segment $z_{s,p,d^*}$ is calculated according to the apparent reflectance $\rho^*_s$. Apparently, in the present example the ground surface reflectivity is obtained by deducing it from the calculation formula of the apparent reflectance.

S604: performing retrieval on the set $Y_{s,p}$:

It can be seen from the previous analysis that the ground surface reflectivity corresponding to the clean segment $z_{s,p,d^*}$ is actually the ground surface reflectivity of the whole pixel set $y_{s,p}$. Therefore, it can be used to retrieve the aerosol thickness value of each pixel in the pixel set $y_{s,p}$. The retrieval method may be selected as needed. A retrieval method used in the present example is as follows:

obtaining parameters corresponding to each aerosol thickness value AOT from the look-up table, calculating an apparent reflectance $\rho_i$ corresponding to each aerosol thickness value AOT according to the ground surface reflectivity of the pixel, where $i=1, 2, \ldots, L$, L is the number of the aerosol thickness value in the look-up table.

For each pixel, an apparent reflectance closest to its apparent reflectance is searched for from the L apparent reflectances $\rho_i$, and an aerosol thickness value AOT corresponding thereto is just the aerosol thickness value of this pixel.

Figure 7:
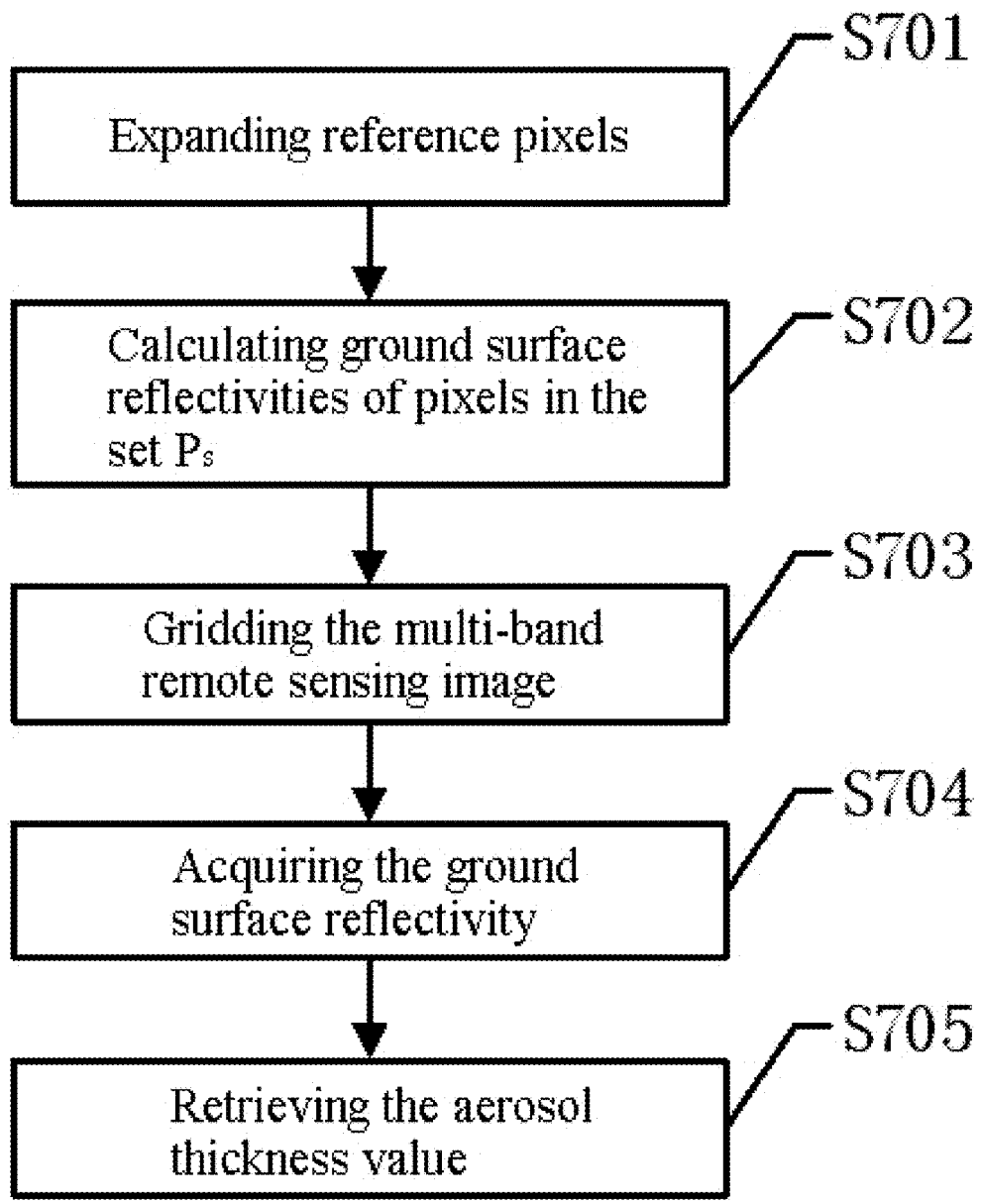
FIG. 7 schematically illustrates a flow chart of performing retrieval on the set $Y_t$.

S105: performing retrieval on the set $Y_t$:

Since retrieval is performed on the pixels in the set $Y_s$ in step S104 to obtain the aerosol thickness value of each pixel, retrieval for the pixels in the set $Y_t$ is performed by taking the pixels in the set $Y_s$ as references. FIG. 7 is a flow chart of performing retrieval on the set $Y_t$. As shown in FIG. 7, detailed steps of performing retrieval on the set $Y_t$ are as follows:

S701: expanding reference pixels:

Each pixel in the set $Y_s$ is traversed, to search for pixels with no value within a predetermined radius. The aerosol thickness value of this pixel is designated as aerosol thickness values of the pixels with no value. A pixel set of all filled and assigned pixels is marked as $P_s$. The searching radius r is generally set as needed, and the smaller the radius is, the more precise the filled aerosol thickness value will be, though the number of pixels remained with no value will be increased. Generally, the searching radius r is within the range of $1 \leq r \leq 10$.

S702: calculating the ground surface reflectivities of the pixels in the set $P_s$:

For each pixel in the set $P_s$, parameters corresponding to the filled aerosol thickness value are obtained from the aerosol optical thickness look-up table, and then the ground surface reflectivity of this pixel is calculated and obtained according to the apparent reflectance.

Figure 8:
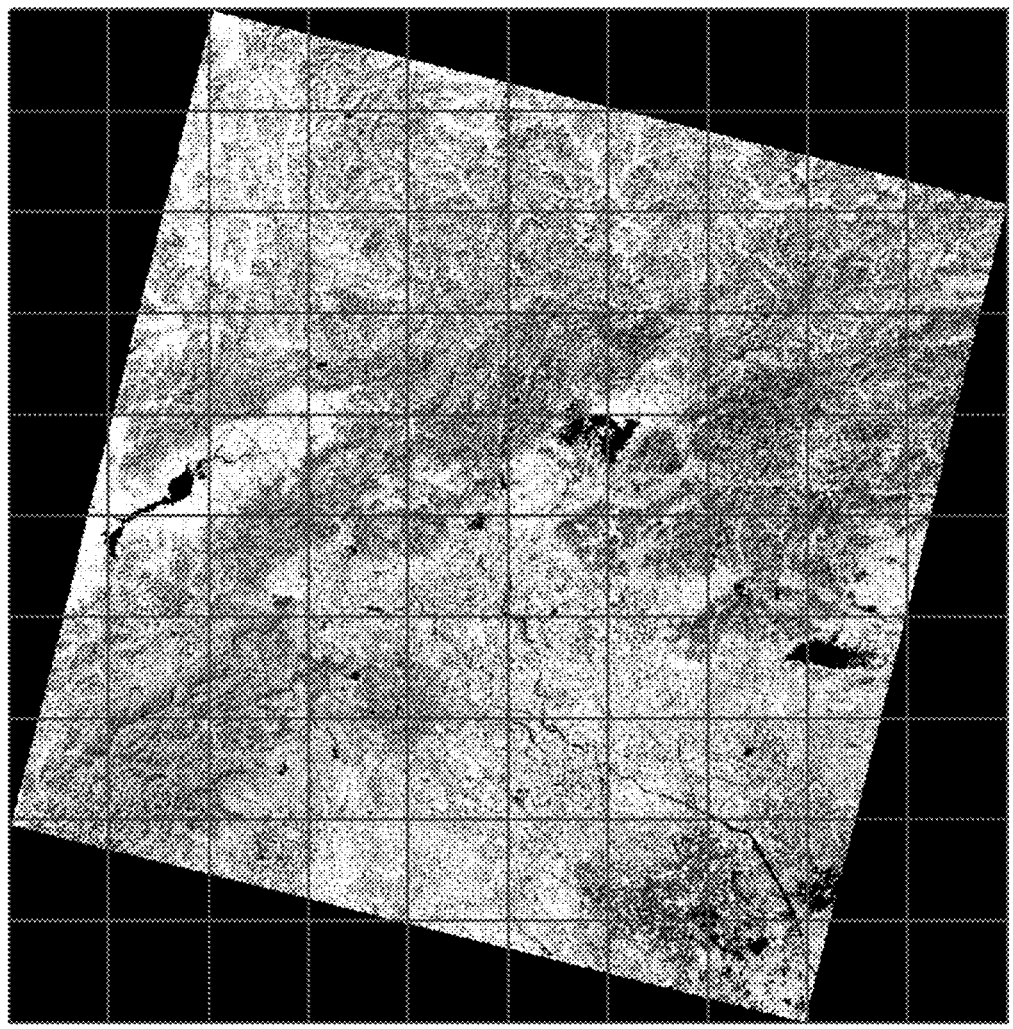
FIG. 8 schematically illustrates a gridding result of the image shown in FIG. 2.

S703: gridding the multi-band remote sensing image:

Considering that the objects have certain correlation in geographic space, the multi-band remote sensing image is partitioned into grids according to a predetermined side length. The predetermined side length can be set according to a resolution of the multi-band remote sensing image. FIG. 8 is a gridding result of the image shown in FIG. 2.

S704: acquiring the ground surface reflectivity:

A q-th pixel set in the set $Y_t$ is marked as $y_{t,q}$, q=1, 2, ..., $|Y_t|$, $|Y_t|$ representing the number of the pixel sets in the set $Y_t$. For each pixel set $y_{t,q}$, an intersection with $P_s$ is obtained for each grid partitioned in step S703. Then the ground surface reflectivity of all pixels of the pixel set $y_{t,q}$ in the current grid is set to be equal to an average ground surface reflectivity value of all pixels in this intersection. Thus, the ground surface reflectivities of the pixels in the set $Y_t$ are obtained.

S705: retrieving the aerosol thickness value:

Aerosol thickness value retrieval is performed for each pixel assigned with the ground surface reflectivity in step S705, to obtain the aerosol thickness value of this pixel.

S106: interpolation of pixels with no value.

Figure 9:
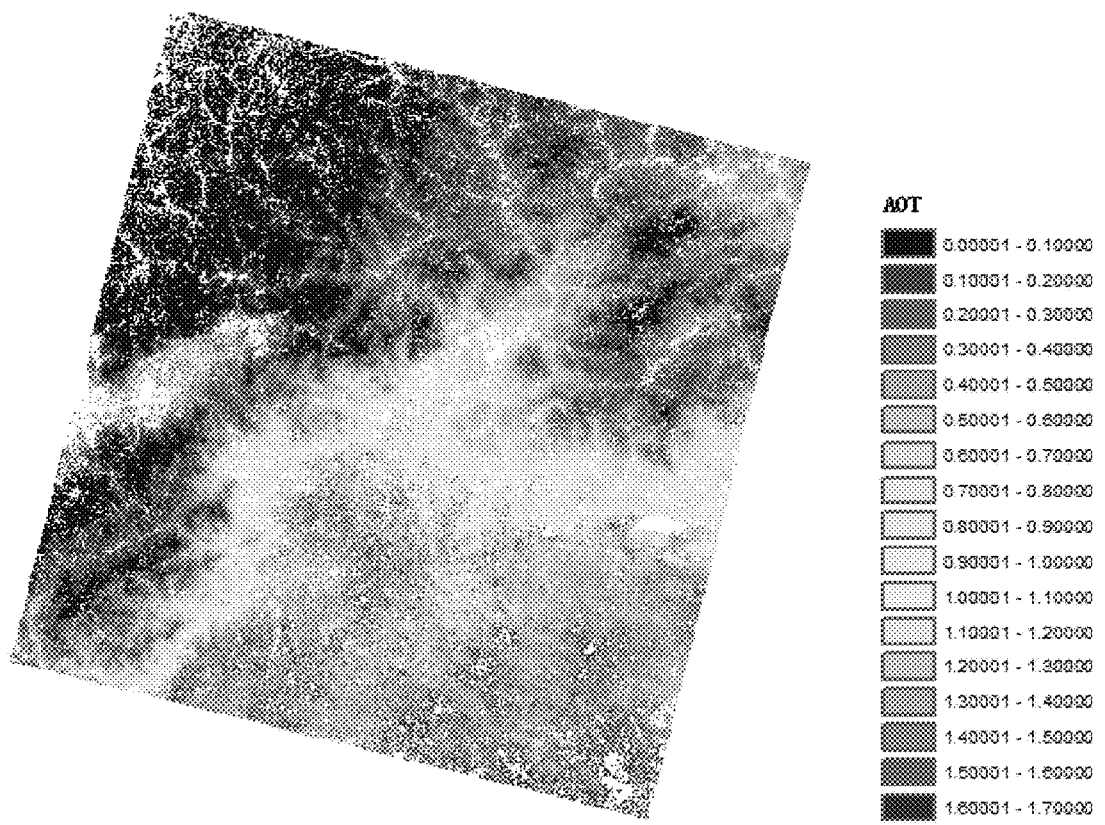
FIG. 9 schematically illustrates a result of retrieving a multi-band remote sensing image shown in FIG. 2 according to the present invention.

Since the pixel sets are screened in step S103 in the present invention, the sets $Y_s$ and $Y_t$ do not contain all pixels of the multi-band remote sensing image, neither can retrieval be performed on all of the pixels in step S105. For the remaining pixels with no value, their aerosol thickness values are filled using an interpolation method. The interpolation method is a common method in the image processing field, which will not be described in detail herein. FIG. 9 schematically illustrates a retrieval result for the multi-band remote sensing image shown in FIG. 2 using the present invention. It can be seen from the result shown in FIG. 9 that the present invention also has good retrieval effect for bright ground surface areas, and therefore has a wider applicability compared with the conventional dark pixel algorithm.

In order to prove the accuracy of the present invention, data of AERONET (Aerosol Robotic Network) ground observation network is downloaded from the website http://aeronet.gsfc.nasa.gov/. The retrieval results of the present invention are compared with the ground observation data and the retrieval results of the dark pixel algorithm, and two selected sites are both located in the city, i.e. belonging to bright ground surface areas. Table 2 shows comparison of the retrieval results of the present invention, the dark pixel algorithm retrieval results and the ground surface observation data of the graph as shown in FIG. 2.

TABLE 2

| Site | Beijing | Bejing-RADI |
| --- | --- | --- |
| Observation data | 1.351 | 1.389 |
| Retrieval result of dark pixel method | 1.66 | 1.73 |
| Retrieval result of the present invention | 1.38 | 1.42 |
| Error of the dark pixel method | 0.309 | 0.341 |
| Error of the present invention | 0.029 | 0.031 |

As shown in Table 2, the retrieval results of the present invention are closer to the observation data of the actual sites, and their errors are smaller. It can be seen that for the bright ground surface area, the present invention has good retrieval results. Therefore compared with the dark pixel method, the present invention has a wider application scope.

The above is only the preferred embodiments of the invention and is not intended to limit the invention. For a person skilled in the art, the invention may have a variety of changes and modifications. Any change, equivalent replacement, improvement made within the spirit and principle of the present invention should be included in the protection scope of the invention.

The invention claimed is:

1. A method for retrieving atmospheric aerosol based on statistical segmentation, comprising steps of:
   S1: acquiring a multi-band remote sensing image of an analyzed area, and performing radiometric calibration to obtain a multi-band remote sensing image comprising an apparent reflectance, wherein the multi-band remote sensing image comprises a mid-infrared 1.6 micrometer band and a mid-infrared 2.1 micrometer band, and one band is selected from the multi-band remote sensing image as an retrieval band;
   S2: inputting the multi-band remote sensing image into an atmospheric radiative transfer model, obtaining a corresponding aerosol optical thickness look-up table according to the retrieval band, wherein the look-up table comprises parameters corresponding to each aerosol thickness value AOT for calculating the apparent reflectance;
   S3: for all pixels in the multi-band remote sensing image, performing segmentation using a statistical segmentation method, wherein the segmentation method comprises steps of:
   S3.1: partitioning an apparent reflectance range of the mid-infrared 2.1 micrometer band into N segments $\varphi_n$, according to a predetermined interval $\lambda_1$, n=1, 2, ..., N;
   S3.2: based on apparent reflectances of respective pixels of the multi-band remote sensing image in the mid-infrared 2.1 micrometer band, allocating the respective pixels into corresponding segments, to obtain pixel sets $x_n$ corresponding to respective segments $\varphi_n$;
   S3.3: for each pixel set $x_n$ obtained in step S3.2, in condition that a number of pixels in the pixel set $x_n|x_n| \geq T_1$, $T_1$ being a predetermined threshold value, retaining the pixel set, otherwise deleting the pixel set; marking retained pixel sets as $x_{n'}$, n'=1, 2, ..., N', N' being a number of retained pixel sets;
   S3.4: partitioning an apparent reflectance range of the mid-infrared 1.6 micrometer band into M segments $\gamma_m$ according to a predetermined interval $\lambda_2$, M=1, 2, ..., M;

S3.5: based on apparent reflectances of pixels in each pixel set $x_{n'}$ at the mid-infrared 1.6 micrometer band, allocating respective pixels to a corresponding segment, to obtain pixel sets $y_{n'm}$ corresponding to respective segments $\gamma_m$ in the pixel sets;

S3.6: in condition that a number of pixels in the pixel set $y_{n'm}|Y_{n'm}|\geq T_2$, $T_2$ being a predetermined threshold value, retaining the pixel set $y_{n'm}$, otherwise deleting it; marking retained pixel sets as $y_k$, k=1, 2, ..., K, K being a number of the retained pixel sets;

S3.7: categorizing the K pixel sets $y_k$ retained in step S306 according to a predetermined threshold $T_3$, and in condition that a number of pixels in the pixel set $y_k|y_k|\geq T_3$, $T_3$ being a predetermined threshold value, categorizing the pixel set $y_k$ into a set $Y_s$, otherwise categorizing it into a set $Y_t$;

S4: marking a p-th pixel set in the set $Y_s$ as $y_{sp}$, p=1, 2, ..., $|Y_s|$, $|Y_s|$ being a number of pixel sets in the set $y_s$, performing retrieval on each pixel set $y_{sp}$ one by one according to steps of:

S4.1: partitioning an apparent reflectance range of the retrieved band into D segments $\omega_d$ according to a predetermined interval $\lambda_3$, d=1, 2, ..., D; allocating respective pixels of the pixel set $y_{sp}$ into corresponding segments according to apparent reflectances of the respective pixels at the retrieved band, to obtain a pixel set $Z_{s,p,d}$ corresponding to each segment $\omega_d$ in the pixel set;

S4.2: obtaining pixel sets with a number of pixels $|Z_{s,p,d}|\geq T_4$ by searching the D pixel sets $Z_{s,p,d}$, $T_4$ being a predetermined threshold value, selecting from the obtained pixel sets a pixel set d* having a smallest segment serial number d as a clean segment in the pixel set $y_{s,p}$;

S4.3: designating an apparent reflectance of the clean segment $z_{s,p,d*}$ at the retrieved band as $\rho_s^*=\lambda_3 \times d^*$, and designating a corresponding aerosol thickness value $AOT_{s,p,d*}=AOT_0$, $AOT_0$ being a predetermined aerosol thickness value of the clean segment; obtaining parameters corresponding to $AOT_{s,p,d*}$ from the aerosol optical thickness look-up table, and calculating the ground surface reflectivity corresponding to the clean segment $z_{s,p,d*}$ according to the apparent reflectance $\rho_s^*$;

S4.4: taking the ground surface reflectivity corresponding to the clean segment $Z_{s,p,d*}$ as the ground surface reflectivity of the whole pixel set $y_{s,p}$, and obtaining the aerosol thickness value of each pixel in the pixel set $y_{s,p}$ through retrieval;

S5: performing retrieval on the set $Y_t$ according to the steps of:

S5.1: traversing all pixels in the set $Y_S$, to search for pixels with no values within a predetermined radius, designating an aerosol thickness value of a pixel with no value as the aerosol thickness value of the pixel, and marking all designated pixel sets as $P_s$;

S5.2: for each pixel in the set $P_s$, obtaining parameters corresponding to the designated aerosol thickness value from the aerosol optical thickness look-up table, and then calculating and obtaining the ground surface reflectivity of the pixel according to the apparent reflectance;

S5.3: gridding the multi-band remote sensing image according to a predetermined side length;

S5.4: marking a q-th pixel set in the set $Y_t$ as $y_{t,q}$, q=1, 2, ..., $|Y_t|$, $|Y_t|$ representing a number of the pixel sets in the set $Y_t$; for each pixel set $y_{t,q}$, finding an intersection with $P_s$ from each grid partitioned in step S5.3, and making the ground surface reflectivity of all pixels of the pixel set $y_{t,q}$ in a current grid be equal to an average ground surface reflectivity value of all pixels in the intersection;

S5.5: performing aerosol thickness value retrieval on each pixel assigned with the ground surface reflectivity in the step S5.4, to obtain the aerosol thickness value of the pixel;

S6: for remaining pixels with no values in the multi-band remote sensing image, designating aerosol thickness values thereof through interpolation.

2. The method for retrieving atmospheric aerosol based on statistical segmentation according to claim 1, wherein in step S3.1 the interval $\lambda_1$ is within the range of $0.002\leq\lambda_1\leq 0.01$.

3. The method for retrieving atmospheric aerosol based on statistical segmentation according to claim 1, wherein in step S3.4 the interval $\lambda_2$ is within the range of $0.002\leq\lambda_2\leq 0.01$.

4. The method for retrieving atmospheric aerosol based on statistical segmentation according to claim 1, wherein in step S4.2 the threshold value $T_4$ is within the range of $0.02|Y_s|\leq T_4\leq 0.1|Y_s|$.

5. The method for retrieving atmospheric aerosol based on statistical segmentation according to claim 1, wherein in step S4.3 the interval $\lambda_3$ is within the range of $0.002\leq\lambda_3\leq 0.01$ 6. The method for retrieving atmospheric aerosol based on statistical segmentation according to claim 1, wherein in step S4.4 and step S5.5 the aerosol thickness value is retrieved through the steps of:

obtaining parameters corresponding to each aerosol thickness value AOT from the look-up table, calculating an apparent reflectance $\rho_i$ corresponding to each aerosol thickness value AOT according to the ground surface reflectivity of the pixel, where i=1, 2, ..., L, L being the number of the aerosol thickness value in the look-up table; for each pixel, searching for an apparent reflectance closest to its own apparent reflectance for from L apparent reflectances $\rho_i$, and a corresponding aerosol thickness value AOT thereof being the aerosol thickness value of the pixel.

* * * * *